United States Patent [19]

Yeh et al.

[11] Patent Number: 4,953,104
[45] Date of Patent: Aug. 28, 1990

[54] PAGE BUFFER FOR AN ELECTRONIC GRAY-SCALE COLOR PRINTER

[75] Inventors: Hurjay Yeh; Michael A. Pickup, both of Rochester, N.Y.

[73] Assignee: Eastman Kodak Company, Rochester, N.Y.

[21] Appl. No.: 353,715

[22] Filed: May 18, 1989

[51] Int. Cl.⁵ .............................................. G06F 15/00
[52] U.S. Cl. ...................................... 364/519; 346/157
[58] Field of Search ............................... 364/518–520; 346/157, 154; 358/298, 80

[56] References Cited

U.S. PATENT DOCUMENTS

| | | | |
|---|---|---|---|
| 4,270,141 | 5/1981 | Sakamoto | 358/78 |
| 4,641,252 | 2/1987 | Tokita | 364/518 |
| 4,641,282 | 2/1987 | Ounuma | 365/189 |
| 4,694,406 | 9/1987 | Shibui et al. | 364/518 |
| 4,719,503 | 1/1988 | Craver et al. | 358/12 |
| 4,724,431 | 2/1988 | Holtey et al. | 340/703 |
| 4,730,185 | 3/1988 | Springer et al. | 340/701 |
| 4,774,528 | 9/1988 | Kato | 364/519 |
| 4,831,409 | 5/1989 | Tatara et al. | 346/157 |

*Primary Examiner*—Arthur G. Evans
*Attorney, Agent, or Firm*—J. R. Hanway

[57] ABSTRACT

A data storage system for an electronic color printer which stores data according to what information the data represents. When the data represents area fill and image information, the data is stored in the page buffer according to mode 1 of the invention wherein a plurality of pixels are all defined to have the same color. This color is defined in the memory in a uniform color space format. When the data to be stored is representing text or line graphics information, the data is stored in the page buffer according to mode 2 of the invention. In mode 2, two-bit binary values in the page buffer are assigned to each pixel of a multi-pixel cell. These two-bit values point to additional bytes in the memory block of the page buffer which in turn point to discrete colors in a spectrum of 256 colors. Thus, each pixel within the pixel cell can be printed in a color selected by the color portion of the page buffer. According to mode 3 of the invention, three separate color maps are defined in binary form by the bit patterns stored in the page buffer memory. By standardizing on the memory allocated to the paage and utilizing this memory in different ways according to the nature of the inputted information, the printed page can be accurately stored with a minimum of memory space without a reduction in perceived printing quality.

30 Claims, 5 Drawing Sheets

PAGE BUFFER FOR AN ELECTRONIC GRAY-SCALE COLOR PRINTER

BACKGROUND OF THE INVENTION

1. Field of the Invention

This invention relates, in general, to electronic color printers and, more specifically, to apparatus and methods of storing page data in memory buffers of electronic color printing devices.

2. Description of the Prior Art

Color printers capable of printing pages with text, graphics, and image information can have very demanding memory requirements. In order to obtain the highest quality text and line graphics printing, the data transferred to the printhead must contain all of the necessary information to make the printed data visually accurate. For text and line graphics data, this can be in the form of direct, high resolution "bit-mapped" data with several bits of data associated with each printed pixel. However, for area fill graphics and images, the need for a wider color gamut than the direct bit-mapping system can provide is desirable. This is because more colors can be produced by using half-toning for the rendition of filled area and images.

The conventional approach is to fill a printing buffer using a general purpose CPU to render the full page in memory, and then to print it. To fully utilize a multi-bit gray level printhead in this fashion, four page buffers would be required, one for each color separation of the colors black, cyan, magenta, and yellow. A gray level printhead which can have a four-bit gray scale per pixel for each of the color separations would require a tremendous amount of memory for each page in the buffer. At 400 dots per inch (dpi), a full 11"×17" page would require approximately 64 Mbytes. Such a size is prohibitive, and it is desirable to store the information in a much smaller memory area without materially detracting from the quality of the finished product.

There are three requirements that need to be met in the design of a data structure capable of providing the memory space needed to economically store multi-bit, gray level, color page data. Along with maintaining the memory at the smallest size possible consistent with maintaining an acceptable level of image quality, it is desirable that the memory or buffer system be expandable from a binary system to a multi-bit printing system. In addition, a desirable implementation of a page buffer memory system would be one in which the data structure keeps the hardware costs to a minimum.

In order to obtain a more efficient memory structure for the page buffer of a color printer, it is important to recognize that the sharpness or resolution of printed information must be stored more precisely than color information so that the printed page will be perceived by an observer as having full memory storage. In other words, it is possible to sacrifice some of the resolution defining the color of the printed data without that sacrifice being perceived by the observer. On the other hand, sharp contrast areas such as text and line graphics require more precise data storage and cannot tolerate the sacrifices acceptable in storing color information. The invention disclosed herein uses these principles.

U.S. Pat. No. 4,270,141, issued on May 26, 1981, recognizes the fact that, although a person can detect delicate variations of brightness across boundaries in a picture, he cannot detect variations of color value as easily. That is, even if the degree of fineness of the color graduations is set much less finely than that of the brightness graduations, the quality of the reproduction will not suffer and no practical inconvenience will be caused. Although recognizing that the perception of color changes is less by an observer, the referenced patent applies this principle to the brightness of the picture information and not to the sharpness of the lines or text represented in the data.

U.S. Pat. No. 4,724,431, issued on Feb. 9, 1988, is a good representation of the conventional state of the art practice of using separate bit maps for each color. The display system in this patent includes three bit map memories for storing pixels representative of a graphic display image. Each of the three bit map memories is utilized to display graphics in a particular color. Additional colors may be displayed utilizing the contents of each bit map memory by combining the colors in each bit map memory. Text information is stored in byte form in a data random access memory.

Therefore, it is desirable, and it is an object of this invention, to provide a page buffer system for electronic color printers which makes efficient use of the memory space without sacrificing significant quality in the printed page. It is also desirable that the memory format be compatible with typical data arrangements received from associated apparatus connected to the electronic printer.

SUMMARY OF THE INVENTION

There is disclosed herein a new and useful system and method for storing color page information in the page buffer of a color electronic printer. The system stores image and area fill data in the page buffer according to one format or mode and stores text and line graphic information into the page buffer according to another format or second mode. A third mode of storage is used when the information from the host computer is in the form of device dependent bit mapped data which can be directly inserted into the memory cells of the page buffer.

According to mode 1 of the storage system, a predetermined number of bytes are used to store color space information for the entire area defined by a pixel cell associated with and corresponding to the memory cell. In a specific embodiment of this invention, the memory block contains seven bytes and the corresponding pixel cell contains 16 pixels arranged in a 4×4 area. Three of the memory bytes contain the color space data and the other four bytes of the memory block contain bits which form a pattern indicating that the data stored in the memory block has been stored according to mode 1. As stated, this mode is used for area fill and image information where sharpness is not a prime concern and true color reproduction is important. Thus, even though individual pixels within the 16 pixel cell cannot be printed differently, the color represented by the entire 16 pixel cell will be very accurate and appear to an observer to have all of the sharpness needed for image and area fill information.

According to mode 2 of the data storage system, a predetermined number of bytes in a memory block are associated with a predetermined number of pixels in a memory cell. For consistency with mode 1, the specific embodiment illustrates a memory block containing seven memory bytes and a pixel cell containing 16 pixels in a 4×4 arrangement. Four of the eight-bit bytes in the memory block contain the bits which correspond to the individual pixels in the pixel cell, with two bits corresponding to each pixel. Thus, each pixel can have a decimal value of 0, 1, 2, or 3. The other three memory bytes of the memory block contain three separate color bytes which point to a lookup table of 256 colors, with each byte indicating a specific color in that range of 256 colors. The four decimal values associated with each pixel select one of the three colors indicated in the memory block or, in the case of the 0 decimal value, do not pick any color for printing. Thus, within a 16 pixel cell, three different colors, or no color at all, can be printed at each pixel. Mode 2 of the invention is used primarily for sharp contrast data, such as text and line graphics.

In mode 3 of the invention, six of the seven allocated memory bytes are directly bit mapped for three separate single color pixel cells of 16 pixels each. Mode 3 is used when the data coming from the host computer is in device dependent form and directly bit mapped into the page buffer memory. By combining the three modes and storing the data in the page buffer according to the mode which will produce the desired results, an efficient and accurate data buffer can be provided without the need for the large amount of memory required for gray level representation of color pages according to prior art techniques.

BRIEF DESCRIPTION OF THE DRAWINGS

Further advantages and uses of this invention will become more apparent when considered in view of the following detailed description and drawings, in which.

DESCRIPTION OF THE PREFERRED EMBODIMENTS

Throughout the following description, similar reference charaters refer to similar elements or members in all of the figures of the drawings.

Figure 1:
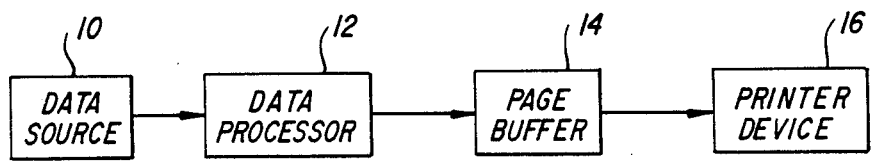
FIG. 1 is a block diagram of a data storage system constructed according to this invention.

Referring now to the drawings, and to FIG. 1 in particular, there is shown a block diagram of a data storage system constructed according to this invention. The data source 10 provides the pixel information or print data to the storage system which includes the data processor 12 and the page buffer 14. The data from the data source 10 typically would be in page description format and usually would originate from a device remote from the memory storage system. In most cases, the data would be in device independent form according to a known and predetermined format, such as PostScript, which is a registered trademark of Adobe Systems Incorporated. In some cases, however, the data applied to the storage system can be in device dependent format where the data can only be faithfully reproduced on the particular printing device associated with the memory storage system, such as the printing device 16 shown in FIG. 1.

Data applied to the data processor 12 is processed and manipulated in such a fashion that it can be stored in the page buffer 14 according to a memory efficient system as described herein. Once stored in the page buffer 14, the data is, at the appropriate time, transferred to the printer device 16 for producing the hard copy output from the electronic data. In certain applications, data may be read for printer use while more data is being stored in the buffer, and direct memory access (DMA) techniques may be employed with the buffer memory. In some cases, the printer device 16 must further process the data from the page buffer 14 to ascertain the correct printing sequence for reproducing the information stored in page buffer 14. In other words, in order to faithfully reproduce a color defined in the page buffer 14, the printer device 16 must take into consideration the exact colors of the pigments or toners used in its printing process, and other factors of the printing process, such as the intensity of the color printed in a specific pixel to give the desired gray level. The data in the page buffer 14 can be outputted to the printer device 16 under the control of the data processor 12 or, in the case of direct memory access, the data in the buffer 14 can be accessed directly at the appropriate time by the printer device 16.

Figure 2:
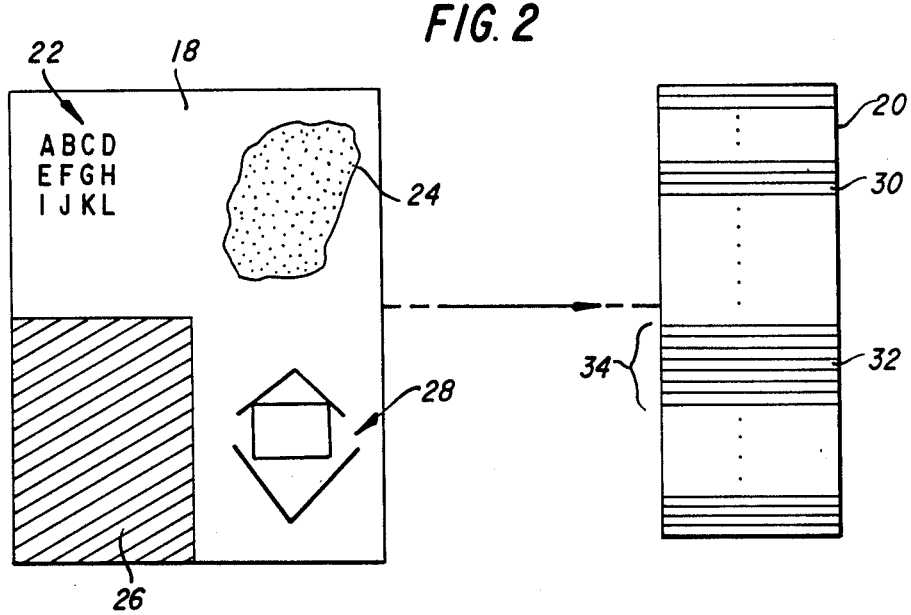
FIG. 2 is a diagram illustrating page content and memory organization.

FIG. 2 is a diagram illustrating page content and memory organization, in general, for the data storage system of this invention. The information page 18 contains four types of print information which are to be stored in the memory 20. Text information 22 is illustrated in one quadrant of page 18. This is characterized by high contrast, sharp lines, and predominant white areas. Another quadrant of page 18 includes an image 24 which could be a continuous pictorial image generated from a high resolution source, such as a photograph or video signals. Another quadrant of page 18 contains area fill information 26 which is characterized by the fact that it is a continuous shaded or solid color region covering a wide area of the page. The fourth quadrant of page 18 contains line graphics 28 which are characterized by sharp lines similar to the text 22. Because of the nature of the various print information on page 18 and its degree of perceivable deviation from exact reproduction, different methods of storing the data can be used in an efficient system for storing all of the data necessary to represent page 18. In other words, to efficiently store the print information on page 18, various memory formats can be used with the ultimate result being an efficient use of overall memory space consistent with high quality reproductions.

Memory 20 shown in FIG. 2 illustrates the general organization of a solid state memory which can be used to store the information shown on page 18. The memory 20 consists of a series of memory positions, or bytes, such as bytes 30 and 32 shown randomly in the memory 20. The memory 20 includes a plurality of such bytes, with each byte being addressable at a different location within the memory 20, and thus being illustrated at a different location within memory 20. The size of the memory 20 is dependent upon the level or detail at which the information is stored, the size of the information, the color content of the information, and upon other variables. In a typical system, the memory 20 could contain several million bytes. Each byte contains a plurality of bits which can store binary data, and in this embodiment of the invention, each byte contains eight bits.

The memory 20 is organized into blocks or slots of memory containing a predetermined number of bytes. In FIG. 2, the memory cell or block 34 contains seven bytes of memory similar to byte 32. The number of bytes per allocated block or slot of memory may be changed depending upon the particular format being used. In any event, the data stored in a block of memory corresponds to an area on the page of information. In other words, a particular area or group of pixels on the page 18 corresponds to the block 34 in the memory 20, and consequently the data which will be reproduced from block 34 is expected to provide the reproduction of that portion of the page shown in FIG. 2. This is not to say that a particular memory block is always allocated to the same position on the page 18. More accurately stated, a particular area on the page 18 is stored in a particular block of data in the memory 20, although the block may be at a different position in the memory for different pages of information.

Figure 3:
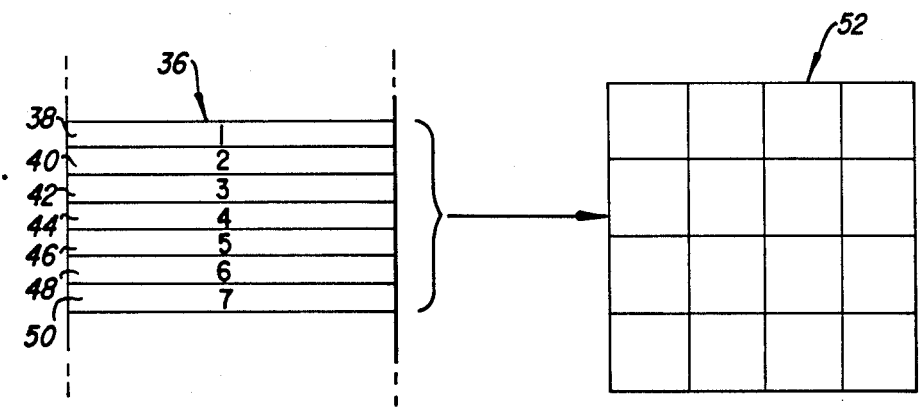
FIG. 3 is a diagram illustrating the general memory allocation for corresponding pixel locations according to the invention.

FIG. 3 is a diagram illustrating the general memory allocation for the corresponding pixel locations according to this invention. In FIG. 3, the memory cell or block 36 contains the memory bytes 38, 40, 42, 44, 46, 48 and 50. This seven-byte block corresponds to the pixel cell, set, or area 52 also shown in FIG. 3. Pixel area 52 contains 16 pixels arranged in a 4×4 pixel format. Thus, the data stored in the memory block 36 of the page buffer 14, shown in FIG. 1, corresponds to a 4×4 pixel area 52 for the page being stored and ultimately reproduced.

The manner of storing the data in the memory block 36 depends largely upon the type of information represented by the memory data. In other words, depending upon whether the information is text, image, area fill, or line graphics, the particular format used for storage in the block 36 is customized or tailored to adequately store the information efficiently consistent with a perceivable quality in the finished product, or page reproduced from the stored data. Since some of the types of information contained on the page 18, FIG. 2, require higher reproduction contrast or sharpness, while others require lower contrast but more faithful color reproduction, the storage requirements and methods for different data are handled differently by this invention, as will be discussed herein.

Figure 4:
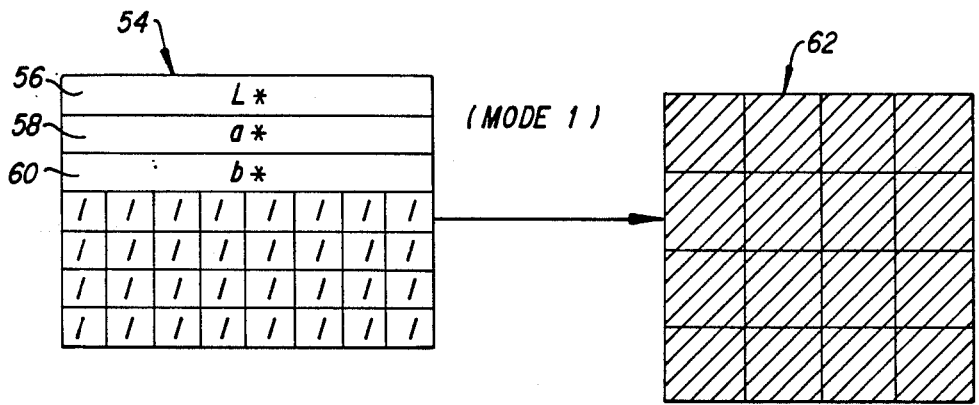
FIG. 4 is a diagram illustrating a specific memory format and the corresponding pixel area layout according to mode 1 of the invention.

FIG. 4 is a diagram illustrating a specific memory format for the corresponding pixel area layout according to mode 1 of the invention. In mode 1, the page description data is describing an area fill or pictorial image area of the page. With this type of information, detailed sharpness or fineness of an individual line is not of primary importance. It is the faithful reproduction of the colors over a relatively wide area of the image that is the desired storage criteria for efficient use of the memory consistent with accurate image reproduction. Consequently, in storage mode 1 of this invention, such data is stored for a large pixel area containing several pixels as opposed to storing it for each individual pixel. In other words, the seven-byte memory slot is used efficiently to store color information for a group of pixels rather than for detailed fineness or sharpness information for the area, which would require storage for each individual pixel.

According to FIG. 4, the seven-byte memory cell or block 54 contains three bytes 56, 58 and 60 of device independent color space information. Although shown in the L*a*b* format, other color space designations may be used such as L*u*v*. The remaining four bytes of the memory block 54 contain a bit pattern which indicates, when the memory is used by the printer device 16, that the information stored in the seven-byte memory block 54 has been stored according to mode 1. In this particular example, each bit of the remaining four bytes of memory block 54 contains a binary "1". As will be more apparent from the discussion of mode 2 of the invention, three other bit patterns may be represented by the remaining four bytes of the memory block 54 to indicate a mode 1 data storage. These include all binary "0"'s, and alternating binary "0"'s and "1"'s or "1"'s and "0"'s. Every two bits in the additional four bytes corresponds to a single pixel in the printed page. As long as each corresponding two bits of the four bytes are the same for all 16 pixels, mode 1 is selected. In reality, mode 1 is indicated by the two-bit patterns indicating the same color for each pixel. Mode 2 would be selected otherwise.

According to FIG. 4, all of the pixels in the pixel area 62 are to be of the same exact color, which is defined by bytes 56, 58 and 60 in the memory block 54. In mode 1, sharpness of the reproduced copy is not of prime importance and, therefore, the memory has been organized to sacrifice individual pixel descriptions as opposed to more accurate descriptions of the color content for all 16 pixels as a group. In general, according to mode 1, the data from the data source is stored using a plurality of bytes to define the color of the complete pixel area, and the remaining bytes of the memory block are used to indicate that the data storage is according to mode 1.

Since the color information is in device independent form as received from the data source, the storage in the same format into the memory block 54 is easily handled by the processor in the memory system. The processor handles the additional function of generating the identifying word or bytes which are stored in the remaining bytes of the memory block 54 when mode 1 is to be indicated. Consequently, the reproduced page derived and printed from data included in the memory block 54 would include the pixel area 62 which is accurately defined in color for all the pixels, although there is no distinguishing information between any particular pixel. Storage in this format is most efficient when the color information is to be faithfully reproduced and sharpness of the reproduction is not a perceivable limitation at the resolution of the 4×4 pixel area.

Figure 5:
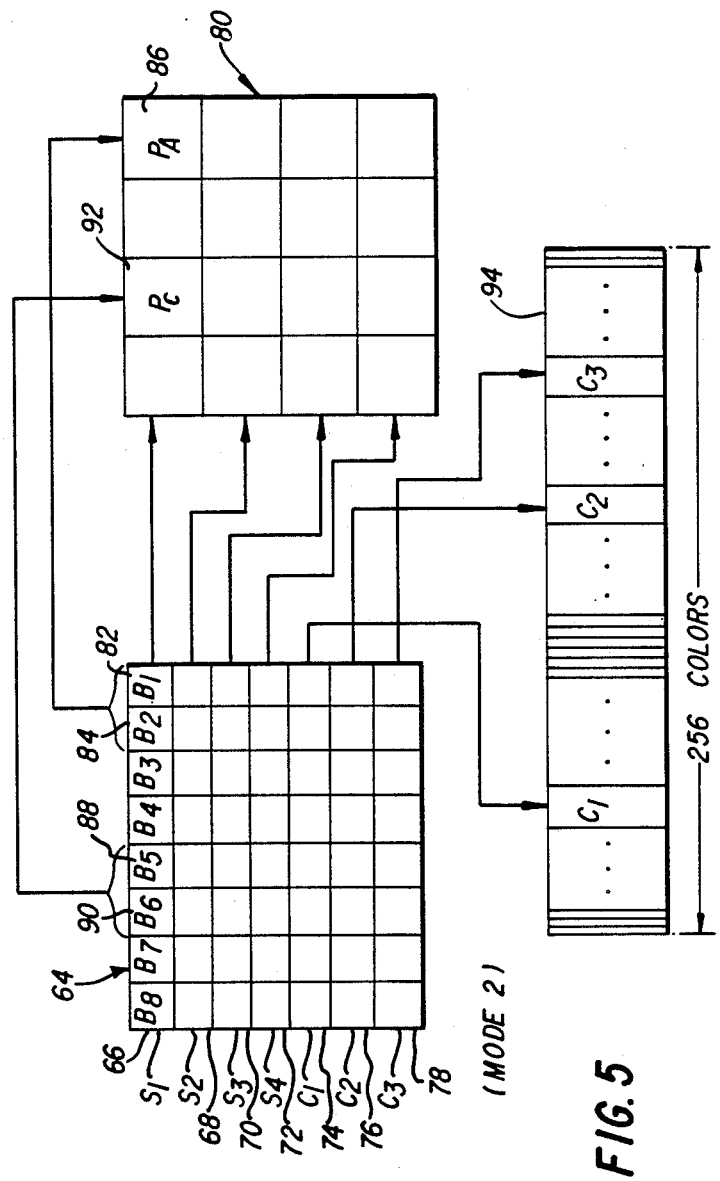
FIG. 5 is a diagram illustrating general memory format and corresponding pixel area layout according to mode 2 of the invention.

FIG. 5 is a diagram illustrating general memory format and the corresponding pixel area layout according to mode 2 of the invention. In mode 2, which is used when text or line graphics information is to be stored, sharpness is of primary concern, and each pixel of the 4×4 pixel area is described separately in the memory block. According to FIG. 5, the memory block 64 contains the four sharpness or location memory bytes 66, 68, 70 and 72, and the three color memory bytes 74, 76 and 78. Each byte contains eight bits as indicated in FIG. 5 for the first sharpness byte 66. All seven bytes of the memory block 64 are used to define the information needed to accurately reproduce each of the pixels in the pixel area 80. Each pixel of the pixel area 80 corresponds to a two-bit number or value in the memory block 64. For example, bits 82 and 84 correspond to pixel 86, and bits 88 and 90 correspond to pixel 92. Therefore, all 16 pixels of the pixel area 80 correspond to a two-bit number contained in the four bytes 66, 68, 70 and 72 of the memory block 64. The location of a bit pair in the memory block 64 effectively defines the location in the pixel area 80 of the individual pixel represented by the bit pair.

The color to be printed in the pixel area depends upon the value of the bit pairs in memory block 64. With two bits, each bit pair can select four options or colors to be printed in the corresponding pixel. One of the four bit pair values is used to indicate that no color will be printed in the corresponding pixel. The other three values are used to indicate and point to an additional byte in the memory block, or a three-byte lookup table. In other words, when a bit pair indicates that the pixel should be printed, it selects one of the three color bytes 74, 76 or 78, which further defines, in an eight-bit quantity, the specific color to be printed in that pixel. Having eight bits to define a particular color allows each of the color bytes 74, 76 and 78 to point to a single color in a range of 256 colors, as shown in the color spectrum 94. Consequently, the 16 pixels in the pixel area 80 can be left blank or printed in any of three total colors, with the three colors being selected from a range of 256 colors.

Figure 6:
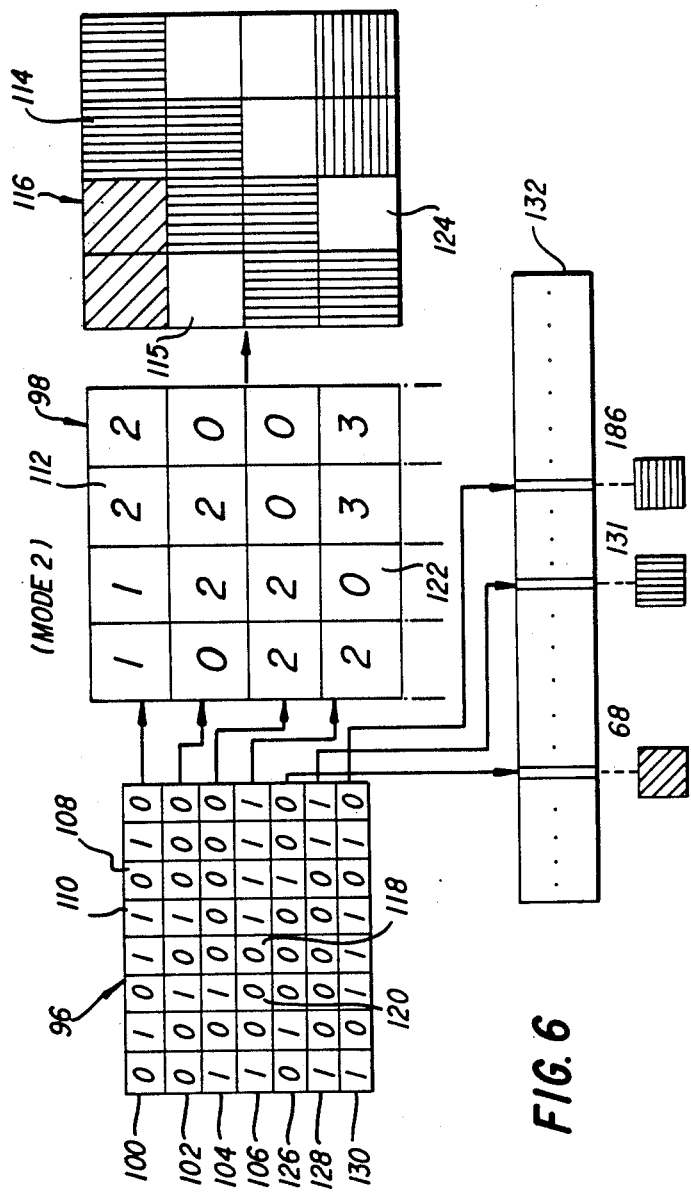
FIG. 6 is a diagram illustrating specific memory values and corresponding pixel colors for mode 2 of the invention.

FIG. 6 is a diagram illustrating specific memory values and the corresponding pixel colors for mode 2 of the invention, and is included herein to further define the memory and pixel arrangement according to mode 2 of the invention. In this particular example of mode 2 operation, the specific bit values for all of the bytes in the memory block 96 are illustrated. Pixel value chart 98 indicates the decimal equivalent of the binary bit pairs contained in the first four bytes 100, 102, 104 and 106 of memory block 96. For example, bits 108 and 110 correspond to a decimal value of 2 which is indicated in the chart 98 at position 112. This location also corresponds to the pixel 114 of the pixel area 116. Bits 118 and 120 of memory block 96 represent a 0 decimal value corresponding to the position 122 and pixel 124 in the chart 98 and area 116, respectively. Each of the values in the chart 98 can have four decimal values, 0, 1, 2 or 3. A value of 0 indicates that no color will be printed in the corresponding pixel as shown at pixel 115 in pixel area 116. The decimal values of 1, 2 and 3 indicate which of the color bytes 126, 128 or 130 are to be used for the particular pixel in defining the color to be printed in that pixel position. A decimal value of 1 corresponds to byte 126, a decimal value of 2 corresponds to byte 128, an a decimal value of 3 corresponds to byte 130.

The three color bytes 126, 128 and 130 define three specific colors in the color spectrum 132 which will be printed when that particular color byte is specified by the bit pair corresponding to a particular pixel. For example, position value 112 is a decimal 2 in chart 98 which points to byte 128 in memory block 96. This byte in turn has a decimal value of 131 which points to the 131st color in the color spectrum 132 which contains 256 color selections. If the pixel position value is 1, the byte 126 would be specified and the color 68 would be printed for that particular pixel. If the value of 3 is indicated for a pixel, the byte 130 would be selected and the color 186 would be printed for that pixel. Note that 68, 131 and 186 are the decimal values of the three bytes 126, 128 and 130, respectively. Thus, the complete 4×4 pixel area 116 can include three separate colors, or an absence of color, as defined for each pixel of the pixel area. Although only two bits are used to indicate which color will be printed, a range of 256 colors is available for selection due to the increased bit capacity of the color selection bytes. By using this technique for storage mode 2, some sacrificing of a full range of colors is made to obtain the advantage of being able to specify a color for each pixel within the 4×4 pixel area.

Figure 7:
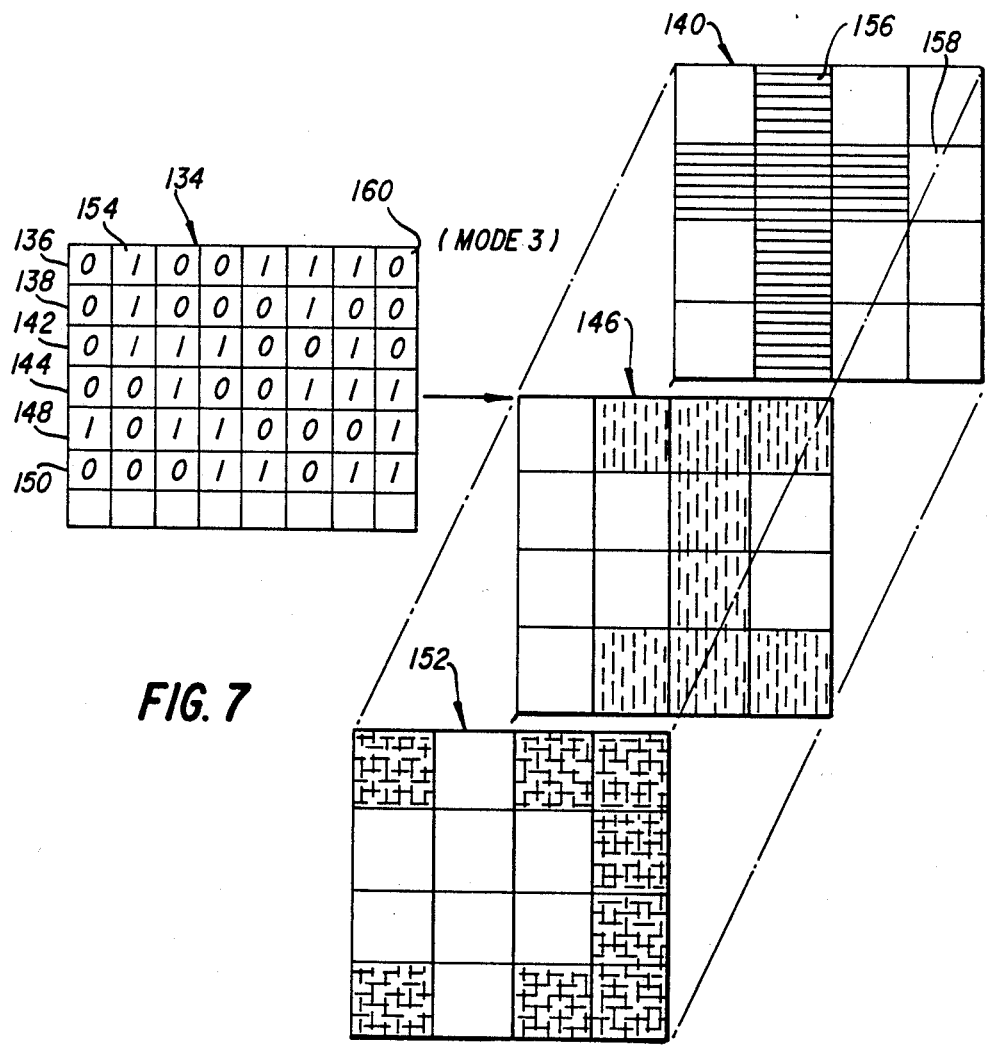
FIG. 7 is a diagram illustrating specific memory values and corresponding pixel area layouts according to mode 3 of the invention.

FIG. 7 is a diagram illustrating specific memory values and the corresponding pixel area layouts according to mode 3 of the invention. Mode 3 is used for configuring the storage memory for corresponding pixel locations when the data obtained from the data source is in device dependent form or, in other words, the data has been formed with the knowledge of which particular colors must be printed in a specific area to provide the desired reproduction of the stored page. In mode 3, six of the seven bytes in memory block 134 are used to define three separate overlapping pixel areas. Bytes 136 and 138 define the pixels in the pixel area 140. Bytes 142 and 144 define the pixels in pixel area 146. Bytes 148 and 150 define the pixels in pixel area 152. Typically, pixel area 140 would correspond to a printing or toner color of cyan, pixel area 146 would correspond to magenta, and pixel area 152 would correspond to yellow.

Each pixel in the corresponding pixel area is represented by a single bit in the corresponding two bytes of memory. If the bit is a binary "0", nothing is printed in the pixel area. If the bit is a binary "1", the corresponding color is printed in the pixel area. For example, the top row of pixels in the pixel area 140 is represented by the four most significant bits in the byte 136. Thus, bit 154 indicates that pixel 156 should be printed in cyan. The next row of pixels in pixel area 140 is represented by the four least significant bits of byte 136. Thus, pixel 158 is not printed in cyan because of the "0" at bit 160. The third and fourth rows in pixel area 140 are represented by the most significant and least significant four bits in the byte 138, respectively. By similar analysis, the corresponding pixels in pixel areas 146 and 152 are represented by the bits in bytes 142, 144, 148 and 150. Mode 3 of the invention is a storage format which is a bit mapped technique having more conventional aspects than the memory storage formats used in modes 1 and 2. Mode 3 is used as an alternative to modes 1 and 2 when the data coming from the data source has already taken into consideration the parameters of the printing device 16 and is giving device dependent data in bit mapped form to the page buffer 14.

If is emphasized that the page buffer memory formats shown for modes 1 and 2 do not take into consideration further processing by the printing device which would involve conventional and ordinary processing as known by those skilled in the art for reproducing the colors indicated by the data in the page buffer. For example, in mode 1, although a particular shade of color is to be depicted for all 16 pixels of the pixel area 62, the printer may combine different colors in each pixel to produce the resultant color, or vary the "gray" level to intensify one or more colors to produce a certain level or intensity of the desired color. The important aspect is that the 16 pixel area 62 appears, to an observer at normal distance, to represent for the entire pixel area 62 the color defined by the color space quantities contained in bytes 56, 58 and 60 of the memory block 54. As regarding mode 2, particular pixels within the pixel area 116 are produced in the proper color by the capabilities of the printing device. For example, with a conventional gray level color printing scheme, a particular pixel may contain up to three overlayed subtractive colors each having an intensity depending upon the level needed to produce the resultant color. In some cases, the printer device electronics may interpolate between adjacent 16-pixel areas and vary the printed pixel colors from those stored in the corresponding memory block to obtain more accurate color reproductions across the page.

Figure 8:
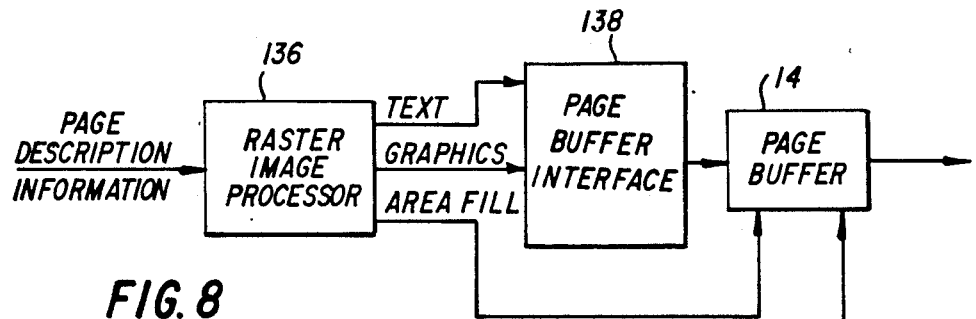
FIG. 8 is a block diagram illustrating data processing prior to storage of the data in the page buffer.

FIG. 8 is a block diagram illustrating data processing which occurs prior to storage of the data in the page buffer, as shown generally in FIG. 1. According to FIG. 8, page description information or data is applied to the raster image processor (RIP) 136 where, according to techniques known by those skilled in the art, the information is converted or processed into specific pixel and color data. In the case of text or graphics, this data is transferred to the page buffer interface 138 which is described in more detail in connection with FIG. 9. In the case of area fill information existing in the description data, the information is transferred directly to the page buffer 14 as no further processing by the interface 138 is necessary to provide the data format needed for storage into the page buffer 14.

Image information, which normally would come from a separate source, is processed by the image processor 140 to provide the mode 1 format for storage of the image data in the page buffer 14. The function of the processor 140 is to convert the image information, which may be in analog form, into digital form and arrangement for proper insertion into the page buffer although the exact location of the data of the page may be defined in the page description information. Image processors for converting image or video for storage in a solid state memory are well know to those skilled in the art. The processing means provided by devices 136, 138 and 140 supplies the appropriate data format and identity to the page buffer 14.

Figure 9:
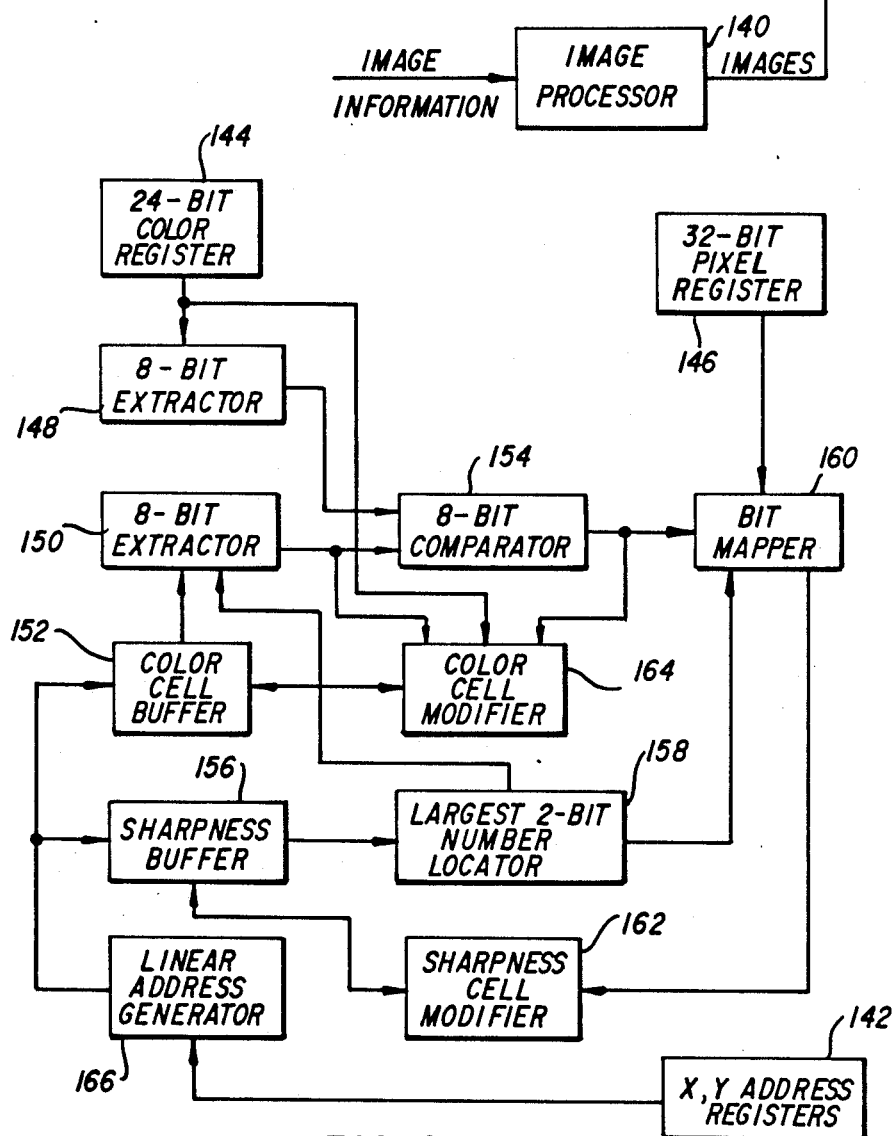
FIG. 9 is a block diagram illustrating the operation of the page buffer interface shown in FIG. 8.

FIG. 9 is a block diagram illustrating the operation of the page buffer interface shown in FIG. 8. When the raster image processor 136 (FIG. 8) generates data for one page, it fills the page buffer by writting to the x,y position address registers 142, the color register 144, and the 32-bit, one dimensional, bit-map or pixel register 146. The bit-map register 146 associated with the position registers 142 determines the pixels which are printed with the color specified in the color register 144. Linear address generator 166 provides the address data to the buffers 152 and 156 from the data in the registers 142.

By having the memory structure organized with 4 by 4 pixels for each cell, the conversion requires 8 memory read and write operations. The 32-bit register 146 covers eight 4 by 4 cells. In order to write the data into the page buffer, each cell in the page buffer needs to be read and checked with the incoming data to determine the modification of the sharpness cell word and the color cell word.

As shown in FIG. 9, the 24-bit color information in the register 144 is compressed or reduced in possible variations by the 8-bit extractor 148. This extractor provides for up to 256 colors out of the 24-bit color designation contained in register 144. A similar extraction is accomplished by the 8-bit extractor 150 for the 24 bits of color information in the color cell buffer 152, although the format of representing colors in the buffer 152 is different than that used in the register 144. The extractor color data is compared in the 8-bit comparator 154 to determine whether the two colors are in the same range. The sharpness buffer 156 is arranged in 4 by 4 cells which contain 32 bits. The locator 158 locates the largest 2-bit number in the 4 by 4 pixel sharpness buffer 156. This value is used by the bit mapper 160 to encode the sharpness value of the current pixel as accomplished by the cell modifier 162. According to the result of the color comparison, the cell in the color buffer 152 will be modified by the color cell modifier 164 and written back to the color cell buffer 152. The sharpness buffer data is modified by adding the current pixel value and writing the result back to the sharpness buffer 156.

It is emphasized that numerous changes may be made in the above-described system without departing from the teachings of the invention. It is intended that all of the matter contained in the foregoing description, or shown in the accompanying drawings, shall be interpreted as illustrative rather than limiting.

We claim as our invention:

1. A data storage system for an electronic color printer, said system comprising:
   means for inputting printing data;
   a plurality of memory cells for storage of processed data which represents print information for a plurality of pixels, with each cell containing a plurality of memory bytes;
   means for processing said printing data into the processed data for storage into said memory cells, said processing means indicating whether said processed data is to be stored according to one of at least two modes of storage, with a first of said modes storing in a memory cell processed data which represents only one color for all of the pixels corresponding to that cell, and a second of said modes storing in a memory cell processed data which represents particular colors for each individual pixel corresponding to that cell; and
   means for outputting the stored data to a printing mechanism.

2. The color printer data storage system of claim 1 wherein the inputted printing data is in device independent form.

3. The color printer data storage system of claim 2 wherein the processed data stored in a memory cell according to the first mode is in device independent form.

4. The color printer data storage system of claim 2 wherein the processed data stored in a memory cell according to the second mode is in device dependent form.

5. The color printer data storage system of claim 1 wherein there are sufficient memory cells to define one complete page of printing data.

6. The color printer data storage system of claim 1 wherein each memory cell contains seven eight-bit bytes.

7. The color printer data storage system of claim 1 wherein each memory cell represents print information for a group of sixteen adjacent pixels.

8. The color printer data storage system of claim 1 wherein a third mode of storage is available, with said third mode storing in a memory cell device dependent binary data which indicates, for a particular color, which pixels are to be printed.

9. The color printer data storage system of claim 8 wherein each cell is allocated a predetermined number of bytes for each of three colors for printing the corresponding pixels.

10. The color printer data storage system of claim 1 wherein the first mode stores color information in uniform color space format.

11. The color printer data storage system of claim 10 wherein color space variables L*, a*, and b* are stored separately in eight-bit bytes.

12. The color printer data storage system of claim 1 wherein the mode of storage in the memory cells is indicated by a pattern of bits in a plurality of bytes of the cell.

13. The color printer data storage system of claim 12 wherein the mode is indicated by a plurality of two-bit binary numbers.

14. The color printer data storage system of claim 13 wherein the second mode is indicated when any of the two-bit binary numbers are different.

15. The color printer data storage system of claim 13 wherein the first mode is indicated when all of the two-bit binary numbers are the same.

16. The color printer data storage system of claim 1 wherein the data stored in the second mode includes a plurality of bits which correspond to separate pixel locations and which point to additional bit words in the same memory cell which specify the color which is to be printed for what pixel location.

17. The color printer data storage system of claim 16 wherein the separate pixel data occupies four eith-bit bytes of a memory cell, and the bit words which specify the color occupy three eight-bit bytes.

18. A method for storing data in a page buffer of an electronic color printer, said method including the steps of:
   processing data from another device and arranging it for storage in memory cells according to first and second modes of storage, with each memory cell corresponding to a plurality of adjacent pixels;
   determining whether the storage of processed data is to be according to the first or second mode for a particular memory cell of the page buffer;
   storing the processed data, if the first mode is determined, with each memory cell defining a single color for all the pixels corresponding to that cell; and
   storing the processed data, if the second mode is determined, with each memory cell defining a particular color for each individual pixel corresponding to that cell.

19. The method of claim 18 for storing data wherein the first mode is utilized for storage when the data predominantly represents images or area fill graphics.

20. The method of claim 18 for storing data wherein the second mode is utilized for storage when the data predominantly represents text of line graphics.

21. The method of claim 18 for storing data wherein the data is in device independent form.

22. The method of claim 18 for storing data wherein the color defined by the data in the first mode is in uniform color space format.

23. The method of claim 18 for storing data wherein the allocated size of the memory cells used for storage in the first and second modes is the same.

24. A method for storing data in a page buffer of an electronic color printer, said method including the steps of:
   processing data from one or more other devices and arranging it for storage in a plurality of seven-byte memory cells according to at least first and second modes of storage, with each memory cell corresponding to a group of sixteen adjacent pixels;
   determining whether the storage of processed data is to be according to the first or second mode for a particular memory cell of the page buffer, with the first mode being used for images and area fill graphics, and the second mode being used for text and line graphics;
   storing the processed data, if the first mode is determined, with three bytes in each memory cell defining a single color in uniform color space format for all the pixels correspondig to that cell; and
   storing the processed data, if the second mode is determined, with three color bytes in each memory cell defining a particular color, and four location bytes of each memory cell having sixteen two-bit binary numbers which designate, for each of the corresponding pixels, which, if any, of the colors defined by the three color bytes represent the desired color of the printed pixel.

25. A method for storing printer data in a page buffer of an electronic, gray scale, color printer, said method including the steps of:
   dividing the buffer into a plurality of memory cells, with each cell corresponding to a predetermined number of adjacent pixels in the printed page;
   processing device independent data from another device; and
   storing the processed data in at least a portion of the memory cells, with each cell containing one uniform color space designation for all the pixels corresponding to that cell.

26. The method of claim 25 for storing printer data including the step of storing a predetermined bit pattern in a portion of the memory cell to indicate that said method was used for data storage.

27. A method for storing printer data in a page buffer of an electronic, gray scale, color printer, said method including the steps of:
   dividing the buffer into a plurality of memory cells, with each cell containing seven memory bytes and corresponding to a set of sixteen adjacent pixels in the printed page;
   processing device independent data from another device;
   determining when the processed data represents image or area fill graphics information;
   storing, when the processed data represents image or area fill graphics information for all of the pixels in a particular pixel set, a color designation in three of the bytes of the corresponding memory cell inuniform color space format; and
   storing, when the processed data represents image or area fill graphics information for all of the pixel in a parricular pixel set, a predetermined bit pattern in four bytes of the memory cell to indicate that said method was used for data storage.

28. A method of saving printer data in a page buffer of an electronic, gray scale, color printer, said method including the steps of:
   dividing the buffer into a plurality of memory cells, with each cell corresponding to a predetermined number of adjacent pixels in the printed page;
   processing device independent data from another device; and
   storing the processed data in at least a portion of the memory cells, with each cell containing a plurality of bits which correspond to individual pixel locations and which point to additional bit words in the same memory cell which specify the color wich is to be printed for that pixel location.

29. A method for storing printer data in a page buffer of an electronic, gray scals, color printer, said method including the steps of:
dividing the buffer into a plurality of memory cells, with each containing seven memory bytes and corresponding to a set of sixteen adjacent pixels in the printed page;
processing device independent data from another device;
determined when the processed data represents text or line graphics information;
storing, when the processed data represents text or line graphics information for all of the pixels in a particular pixel set, two-bit pixel location values in four bytes of the corresponding memory cell, with each two-bit value designating four print conditions for the corresponding pixel; and
storing, when the processed data represents text or line graphics information for all of the pixels in a particular pixel set, eight-bit color value pointers in three bytes of the corresponding memory cell, said three bytes being selected in three of said four print conditions to specify a color for printing, with the fourth designated condition indicating that no color is to be printed.

30. A method for storing gray scale, color, page information in memory cells which correspond to adjacent pixel areas, said method including the steps of:
selecting between first and second modes of storage, with said first mode being selected for image and area fill information in an adjacent pixel area of the page, and with said second mode being selected for text and line graphics information in an adjacent pixel area of the page;
storing first mode information in a multi-byte memory cell, with the cell defining a single color for all the adjacent pixels corresponding to that cell; and
storing second mode information in a multi-byte memory cell, with the cell defining a particular color for each individual pixel in the corresponding adjacent pixel area.

* * * * *